(12) United States Patent
Fletcher et al.

(10) Patent No.: US 11,465,079 B2
(45) Date of Patent: Oct. 11, 2022

(54) LINER FOR A FILTER SUB-ASSEMBLY

(71) Applicant: MANN+HUMMEL GmbH, Ludwigsburg (DE)

(72) Inventors: Neil Fletcher, Somerset (GB); James Eddiford, Bridgewater (GB); Robin Nash, Langport (GB); Anthony W. Fell, Yeovil (GB)

(73) Assignee: MANN+HUMMEL GmbH, Ludwigsburg (DE)

( * ) Notice: Subject to any disclaimer, the term of this patent is extended or adjusted under 35 U.S.C. 154(b) by 722 days.

(21) Appl. No.: 16/214,099

(22) Filed: Dec. 9, 2018

(65) Prior Publication Data

US 2019/0176064 A1    Jun. 13, 2019

(30) Foreign Application Priority Data

Dec. 8, 2017 (GB) .................................. 1720493.4

(51) Int. Cl.

| | | |
|---|---|---|
| *B01D 33/067* | (2006.01) | |
| *B01D 33/11* | (2006.01) | |
| *B04B 5/00* | (2006.01) | |
| *B04B 1/00* | (2006.01) | |
| *B01D 35/30* | (2006.01) | |
| *F01M 11/03* | (2006.01) | |

(52) U.S. Cl.
CPC ............ *B01D 33/067* (2013.01); *B01D 33/11* (2013.01); *B01D 35/30* (2013.01); *B04B 1/00* (2013.01); *B04B 5/005* (2013.01); *B01D 2201/0423* (2013.01); *F01M 11/03* (2013.01)

(58) Field of Classification Search
CPC ...... B01D 33/067; B01D 35/30; B01D 33/11; B01D 2201/0423; B01D 21/262; B04B 1/00; B04B 5/005; B04B 7/12; B04B 7/08; F01M 11/03; F01M 1/10; F01M 2001/1035
USPC ....................................................... 494/44, 45
See application file for complete search history.

(56) References Cited

U.S. PATENT DOCUMENTS

| | | | |
|---|---|---|---|
| 5,514,275 A | 5/1996 | Morgan, Jr. | |
| 8,808,155 B2 | 8/2014 | Zonneveld et al. | |
| 10,940,663 B2 * | 3/2021 | Takemoto | ................ B32B 1/02 |
| 2006/0151379 A1 * | 7/2006 | Fobe | .................... B01D 29/111 |
| | | | 210/418 |
| 2015/0291309 A1 * | 10/2015 | McGregor | .............. A47J 33/00 |
| | | | 220/573.1 |

FOREIGN PATENT DOCUMENTS

| | | |
|---|---|---|
| CA | 980746 A | 12/1975 |
| DE | 19516635 A1 | 11/1995 |
| GB | 2514545 A | 12/2014 |

\* cited by examiner

*Primary Examiner* — Walter D. Griffin
*Assistant Examiner* — Shuyi S. Liu

(57) ABSTRACT

A liner for a filter sub-assembly has a wall having an outermost surface and an innermost surface. The innermost surface bounds a cavity extending between opposing first and second ends of the liner. A portion of the outermost surface is textured. The liner may be used in a rotor of a filter assembly.

27 Claims, 4 Drawing Sheets

LINER FOR A FILTER SUB-ASSEMBLY

BACKGROUND OF THE INVENTION

The invention relates to a liner for a filter sub-assembly. Filter assemblies are known for removing contaminant particles from lubricating oil circuits of internal combustion engines. They are also known for separating particulate matter from liquids, as well as separating liquids of different densities from one another, in a variety of industrial processes. Typically, a filter assembly comprises a housing having a rotor supported therein to spin about a spindle, the spindle providing an axis of rotation. A working fluid from which a contaminant is to be removed, e.g. engine oil, is supplied at elevated pressure along the axis of rotation to the rotor. Subsequently, the pressurized fluid is tangentially ejected from the rotor such that the rotor is caused to spin. As the working fluid flows through the spinning rotor, denser contaminants or particles are separated therefrom by centrifugal force and retained in the rotor, typically as a cake adhering to an interior surface of the rotor. Ejected fluid usually drains to a sump.

As retained contaminant particles agglomerate in the rotor, it is necessary to replace or service the rotor at suitably regular intervals to ensure the continued cleaning efficacy of the filter assembly. Insertable liners are often used to line the interior surface of the rotor to aid cleaning in that contaminant particles become caked onto the insert, which is removable and disposable, instead of the interior surface. However, such liners may stick to the interior surface of the rotor, making their removal difficult and/or time consuming. Contaminant particles that do not form a cake on the liner may be left within the rotor upon removal of the liner. It may also be necessary to maintain a stock of the liners, which requires maintaining adequate storage space.

SUMMARY OF THE INVENTION

It is an object of the invention to at least reduce a problem associated with one or more known arrangements.

According to a first aspect of the invention, there is provided a liner for a filter sub-assembly, the liner comprising: a wall having an outermost surface and an innermost surface, the innermost surface being configured to bound a cavity extending between opposing first and second ends of the liner, wherein a portion of the outermost surface is textured. The liner may improve the ease of servicing and/or cleaning a filter assembly. Particularly, the liner may improve the ease of removing the liner from a rotor body.

In certain embodiments, the portion of the outermost surface may be textured in that the portion comprises a plurality of spaced apart protrusions. The plurality of spaced apart protrusions may be arranged in a regular pattern. A plurality of the spaced apart protrusions may comprise a plurality of bumps, ridges and/or ribs. One or more of the plurality of spaced apart protrusions may extend from the remainder of the outermost surface by a protrusion height of 0.5 mm to 5.0 mm. One or more of the plurality of spaced apart protrusions may extend from the remainder of the outermost surface by a protrusion height of 1.0 mm to 3.5 mm.

Additionally, or alternatively, the portion of the outermost surface may be textured in that the portion comprises a plurality of spaced apart indentations. The plurality of spaced apart indentations may be arranged in a regular pattern.

The textured portion of the outermost surface may be circumferentially continuous. The wall may be formed as a monolithic tubular sleeve. The wall may be formed of or comprise a resiliently deformable material. The wall may be formed of or comprise silicone. The wall may be formed of or comprise a fiber reinforced polymer. The fiber reinforced polymer may include a first plurality of fibers orientated to extend circumferentially along the wall. Additionally, or alternatively, the fiber reinforced polymer may include a second plurality of fibers orientated to extend at least partially between the first and second ends.

Optionally, the wall may have a deflected portion configured to extend into the cavity and delimit an opening. At least the deflected portion of the wall may be substantially rigid. The deflected portion of the wall may form an acute angle with the remainder of the wall. The liner is tapered in that a width of the liner reduces between the first and second ends.

According to a further aspect of the invention, there is provided a filter sub-assembly comprising: a rotary vessel having a rotor body and a closure member separably attachable to the rotor body; and a liner according to any preceding claim, wherein the liner is receivable within the rotor body to line an inner surface thereof.

In certain embodiments, the closure member may be separably attachable to the rotor body by insertion of the closure member into an open end of the rotor body. The closure member may be sealable against the rotor body by the liner. The liner may be removable from the rotor body by separation, i.e. as a direct consequence of separation, of the closure member from the rotor body. The liner may comprise a retention member to facilitate separable attachment of the liner to the closure member.

According to a further aspect of the invention, there is provided a filter sub-assembly comprising: a rotary vessel having a rotor body and a closure member separably attachable to the rotor body; and a liner receivable within the rotor body to line an inner surface thereof, the liner being removable from the rotor body by separation of the closure member from the rotor body.

BRIEF DESCRIPTION OF THE DRAWINGS

Embodiments of the invention will now be described, by way of example only, with reference to the accompanying figures.

DESCRIPTION OF PREFERRED EMBODIMENTS

Figure 1:
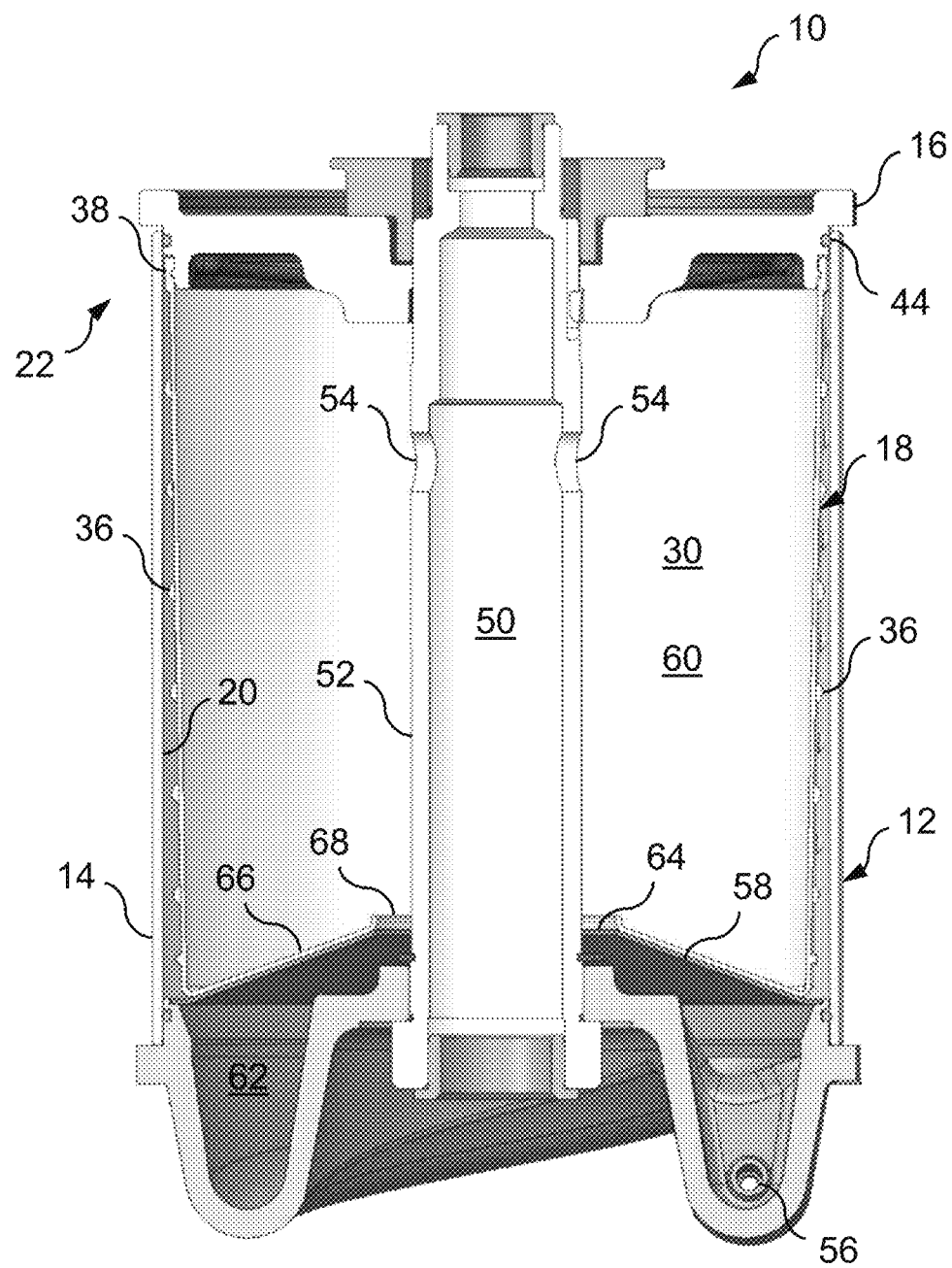
FIG. 1 is a cross-sectional view of a filter sub-assembly according to an embodiment of the invention, in which the sub-assembly is shown having a liner received in a rotor body.

FIG. 1 shows a filter sub-assembly 10 according to an embodiment of the invention. The sub-assembly 10 may have particular application in a motor vehicle, e.g. for cleaning engine oil in an engine lubrication system. However, other applications are contemplated, e.g. oil recovery. The sub-assembly 10 comprises a rotary vessel 12 having a rotor body 14 and closure member 16. The closure member 16 is separably attachable to the rotor body 14. The subassembly 10 further comprises a liner 18 that is receivable within the rotor body 14 for lining an inner surface 20 thereof. As shown in the illustrated embodiment, the liner 18 may be receivable within the rotor body 14 through an open end 22 of the rotor body 14. As the skilled artisan will understand, the closure member 16 is separably attachable to the rotor body 14 to allow for insertion and/or removal of the liner 18 into/from the rotor body 14. The liner 18 may be re-usable or intended for single use.

Figure 2:
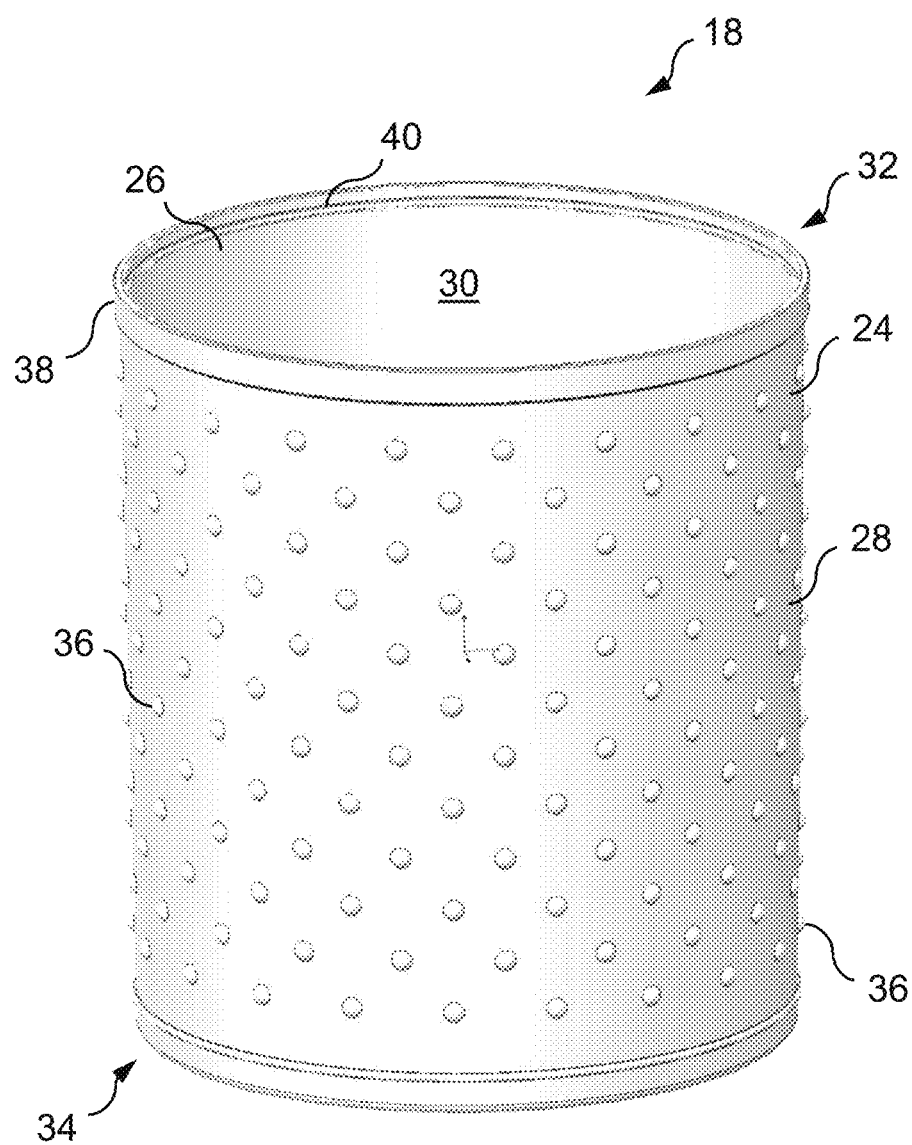
FIG. 2 is a perspective view of the liner of FIG. 1, in which the liner is shown in isolation.

The liner 18 (best shown in FIG. 2) comprises a wall 24 having an innermost surface 26 and an outermost surface 28. The innermost surface 26 is configured to bound, i.e. surround or delimit, a cavity 30 that extends between opposing first and second ends 32, 34 of the liner 18. Of course, in use, the cavity 30 is within the rotor body 14. Each of the first and second ends 32, 34 may be substantially open ends of the liner 18. Crucially, a portion of the outermost surface 28 is textured, i.e. the outermost surface 28 is not smooth. As shown in the illustrated embodiment, the liner 18 may be a monolithic, i.e. one-piece, tubular sleeve. As such, the wall 24 may be circumferentially continuous. However, in certain embodiments, the wall 24 is wrappable, having opposing edges (not shown) extending between the first and second ends 32, 34 such that the edges are wrappable in overlapping relation to one another to bound the cavity 30. The liner 18 may comprise a resiliently deformable, i.e. resilient or elastically deformable, material, e.g. silicone. However, other materials are contemplated, e.g. fiber reinforced polymers, in which fibers may be orientated to extend circumferentially along the wall 24, i.e. parallel to the first and second ends 32, 34, to maximize a hoop strength of the wall 24, at least partially between the first and second ends 32, 34, to increase an axial strength of the wall 24. In certain embodiments, the fibers may be orientated to extend at least substantially exclusively circumferentially along the wall 24.

The outermost surface 28 may be textured in that it comprises a plurality of spaced apart protrusions 36. The protrusions 36 may be of any suitable configuration, e.g. comprising bumps, ribs, ridges or a mixture thereof. The protrusions 36, or a subset thereof, may be arranged in a regular, i.e. repeating, pattern over the textured portion of the outermost surface 28. However, the protrusions 36, or a subset thereof, may be arranged in an irregular pattern. The outermost surface 28 may limit an area of the wall 24 that is contactable with the inner surface 20 of the rotor body 14. As such, the outermost surface 28 may provide one or more voids, e.g. air gaps, between the wall 24 and inner surface of the rotor body 14. In use, the outermost surface 28 may inhibit a frictional force occurring between the liner 18 and the inner surface 20 of the rotor body 14 and/or inhibit the liner 18 from adhering to the inner surface 20 to improve the ease with which the liner 18 is removed from within the rotor 14. As shown in the illustrated embodiment, the portion of the outermost surface 28 that is textured may be substantially all of the outermost surface 28. However, the portion may extend only partially between the opposing first and second ends 32, 34 and/or may extend only partially along, e.g. circumferentially along, the wall 24.

Each of the protrusions 36 may extend by a protrusion height of between at least 0.5 mm and up to 5.0 mm from the remainder of the outermost surface 28. In certain embodiments, each of the protrusions 36 may extend by a protrusion height of between at least 1.0 mm and up to 3.5 mm from the remainder of the outermost surface 28. In certain embodiments, each the protrusions 36 may extend by a protrusion height of 3 mm from the remainder of the outermost surface 28. In the illustrated embodiment, each of the protrusions 36 extends from the remainder of the outermost surface 28 by a protrusion height of 2 mm and has a diameter, or width, of 6.5 mm.

In certain embodiments, the outermost surface 28 may be textured in that it comprises a plurality of spaced apart indentations, which may be in addition to, or in substitution of, the protrusions 36. As the skilled artisan will understand, such indentations may be arranged in the same manner as described above with reference to the protrusions 36, to the same or similar effect.

Figure 3:
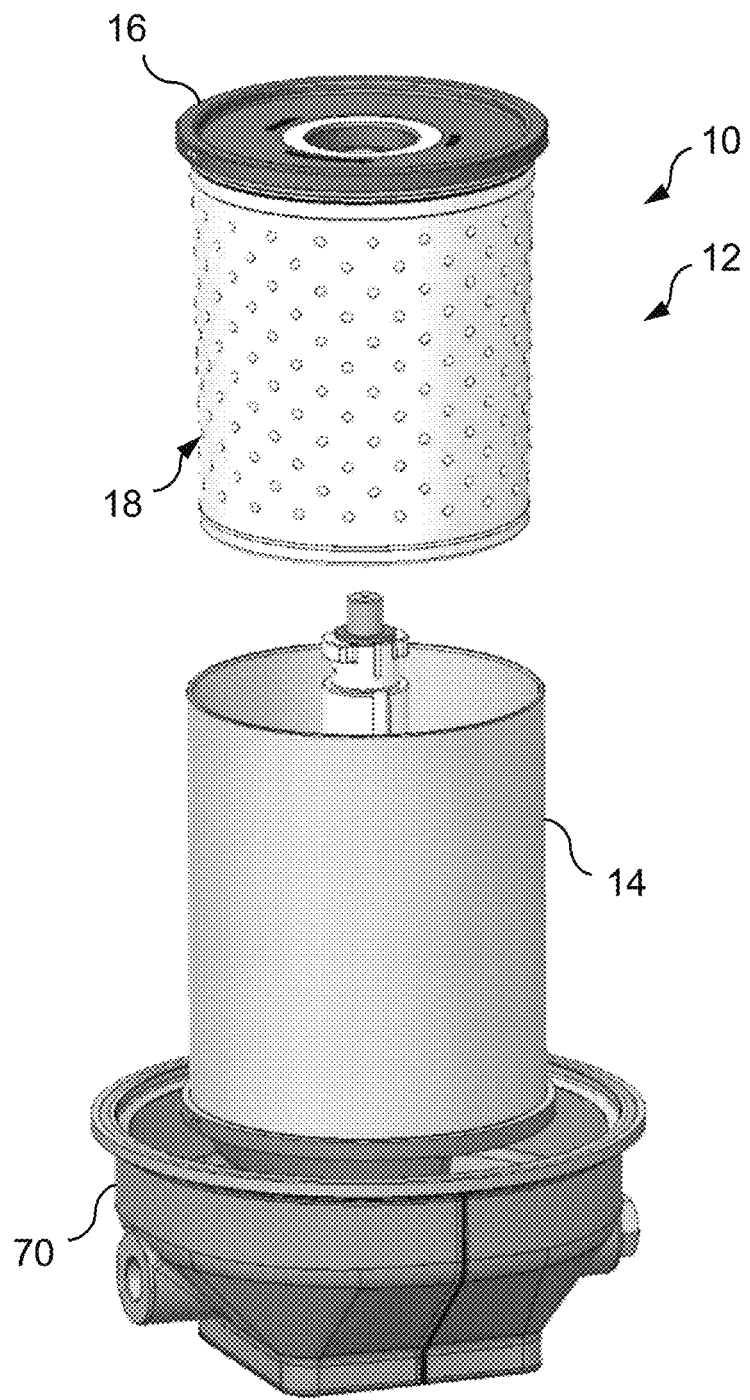
FIG. 3 is a perspective view of the sub-assembly of FIG. 1, in which the liner is shown removed from the rotor body.
Figure 4:
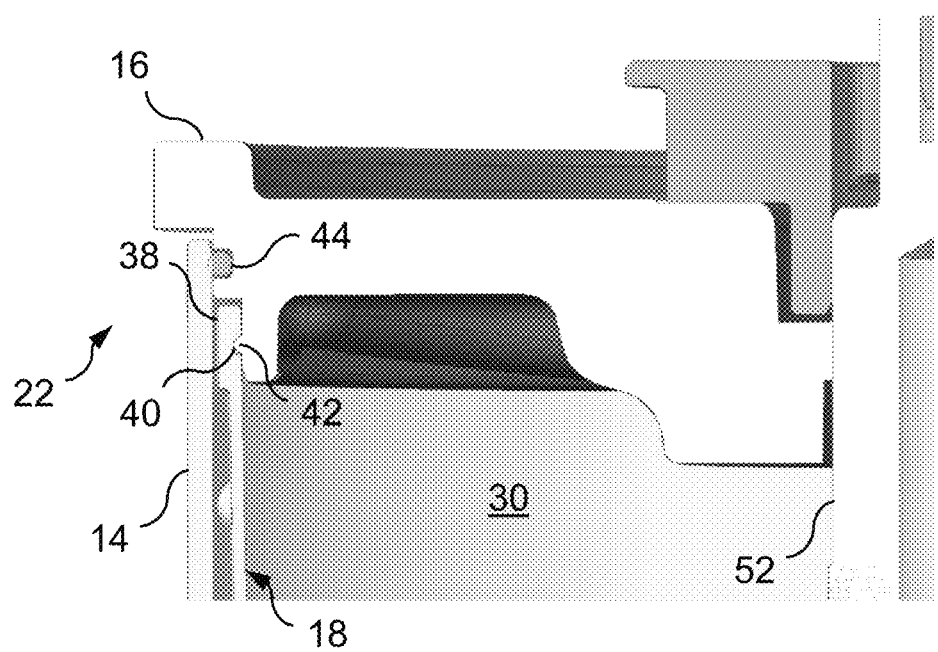
FIG. 4 is an enlarged region of FIG. 1, to clearly show features allowing separable attachment of the liner to a closure member of the sub-assembly.

The liner 18 may be separably attachable to closure member 16. Thus, in certain embodiments, the wall 24 may comprise an edge margin 38 proximate the first end 32 configured to separably attach the liner 18 to the closure member 16. To this end, the edge margin 38 may comprise a groove ("retention member") 40 extending along the wall 24 substantially parallel to the first end 32 (best shown in FIG. 4). The groove 40 may be complementary to a ridge 42 extending around a periphery of the closure member 16. Consequently, the liner 18 may be stretchable over the closure member 16 such that ridge 42 is receivable within the groove 40. Separation of the closure member 16 from the liner 18 may be inhibited by an inherent resilience of the liner 18 exerting a gripping force, e.g. a radially inward force, acting on the periphery of the closure member 16 and/or engagement of the ridge 42 within the groove 40. In certain embodiments, the closure member 16 may comprise the groove 40 and the liner 18 may comprise the ridge 42. The edge margin 38 may have a thickness that is greater than a thickness of the remainder of the wall 24. In certain embodiments, the edge margin 38 and/or the closure member 16 may be otherwise separably attachable to one another, e.g. the edge margin 38 and the closure member 16 may comprise complementary portions of a plurality of snap fasteners (not shown). Indeed, the skilled artisan will understand that the edge margin 38 may comprise any suitable retention member to effect separable attachment of the liner 18 to the closure member 16. The separable attachment of the liner 18 to the closure member 16 may facilitate the removal of the liner from within the rotor body 14, as the liner 18 may be removable from within the rotor body 14 by separation of the closure member 16 from the rotor body 14. FIG. 3 shows the liner 18 removed from the rotor body 14 by separation of the closure member 16 from the rotor body 14.

The liner 18 may be tapered. More specifically, the liner 18 may be tapered in that a width of the liner 18 reduces between the first and the second ends 32, 34. The width may be measurable between opposing, e.g. diametrically opposing, points of the outermost surface 28 at intervals extending between the first and second ends 32, 34. In certain embodiments, the width may reduce substantially linearly.

As shown in the illustrated embodiment, the closure member 16 may be separably attachable to the rotor body 14 by insertion of the closure member 16 into the open end 22 of the rotor body 14. Additionally, or alternatively, the closure member 16 may be frictionally engageable with the open end 22 to inhibit separation of the closure member 16 from the rotor body 14, i.e. the closure member 16 may achieve a friction fit with the open end 22. The closure member 16 may be fluid-tightly sealable against the rotor body 14 by a resilient seal 44 extending along an outer periphery of the closure member 16. Thus, together, the rotor body 14 and the closure member 16 may form a sealable volume. In certain embodiments, the resilient seal 44 may be a conventional elastomeric O-ring seal. However, in certain embodiments, the liner 18 may fluid-tightly seal the closure member 16 against the rotor body 14, in the absence of the resilient seal 44 or together therewith. The liner 18 may fluid-tightly seal the closure member 16 against the rotor body 14 in that the liner 18 may be capturable between the closure member 16 and the rotor body 14. As such, the liner 18 may be compressible to fluid-tightly seal the closure member 16 against the rotor body 14. By using the liner 18 to fluid-tightly seal the closure member 16 against the rotor body 14, a sealing arrangement may be provided that may be more reliably cleaned at service intervals.

As is conventional, the sub-assembly 10 may further comprise a fluid supply duct 50 extending through the rotor body 14 to supply the rotor body 14 with a working fluid, i.e. a fluid to be cleaned/filtered. The working fluid may be engine oil. As shown in the illustrated embodiment, the fluid supply duct 50 may be a bore formed in a bearing tube 52. The bearing tube 52 may be mountable upon a spindle, about which the rotary vessel 12 is rotatable. The rotor body 14 may be connectable to the fluid supply duct 50 with fluid communication by one or more through bores 54 provided in the bearing tube 52. In use, the working fluid may be supplied to the supply duct 50 at elevated pressure to flow from the through bores 54 into the rotor body 16 and thus into the cavity 30.

The rotary vessel 12 may be self-powerable, i.e. a pressurized supply of working fluid to the rotor body 14 may drive rotation of the rotary vessel 12. To this end, the rotor body 14 may comprise a pair of diametrically opposed nozzles 56 at a radial distance from the bearing tube 52 (only one of the nozzles 56 is visible in the cross-sectional view shown in FIG. 1). As the skilled artisan will understand, other configurations of the nozzles 56 may be possible, e.g. the rotor body 14 may comprise three or more of the nozzles 56. Each of the nozzles 56 is configured to eject working fluid from the rotor body 14 in a direction generally tangential to the rotor body 14. As the skilled artisan will understand, the tangential emission of pressurized working fluid generates a reactive force that may cause rotation of the rotor body 14 relative to a base 70 (see FIG. 3), upon which the bearing tube 52 may be mountable.

In use, as working fluid flows through the rotor body 14, and thus through the cavity 30, centrifugal force causes separation of contaminant material within the working fluid. Separated contaminant material may accumulate within the cavity 30, primarily as a cake adhering to the innermost surface 26 of the liner 18. Fluid exiting the rotor body 14, through the nozzles 56, may drain to a sump. As contaminant accumulates within the cavity 30, i.e. within the liner 18, the rotary vessel 12 must be serviced to empty the separated contaminant particulate matter that has accumulated on the liner 18. The frequency of servicing will vary depending on the embodiment, the operating environment, and the number of operating hours. To service the rotary vessel 12, the closure member 16 is separated from the rotor body 14. In certain embodiments, separation of the closure member 16 from the rotor body 14 will expose the liner 18 within the rotor body 14. Consequently, the liner 18 is removable from the rotor body 14, along with the separated contaminant particulate matter contained therein. Alternatively, as described above, the liner 18 may be removable from within the rotor body 14 by separation of the closure member 16 from the rotor body 14. The liner 18 may be washed or otherwise suitably cleaned, before returning the liner 18 to the rotor body 14. Flexion of the liner 18 may facilitate the removal of separated contaminant particulate matter adhered to the innermost surface 26.

The sub-assembly 10 may further comprise a divider 58, which the skilled artisan will understand may be termed a "separation cone". The divider 58 may be substantially rigid. The divider 58 may be receivable within the rotor body 14 to in part delimit upper and lower chambers 60, 62 of the rotor body 14, the upper and lower chambers 60, 62 being arranged on opposing sides of the divider 52. Consequently, the liner 18 may line the inner surface 20 of the rotor body 14 within the upper chamber 60. The divider 58 may comprise a first opening 64 to connect the upper and lower chambers 60, 62 to one another to provide fluid communication. In use, the working fluid may flow into the upper chamber 60, before flowing through the first opening 64 downwardly, into the lower chamber 62. The first opening 64 may surround the bearing tube 52. The divider 58 may serve to direct flow of the working fluid within the upper chamber 60 from a downward direction adjacent the inner surface 20 back upward and towards the first opening 64. To this end, the divider 58 may be frustoconical. The divider 58 may slow the rate of flow of the working fluid within the rotor body 14 to enhance separation of particulate matter and/or may inhibit accumulated particulate matter from descending into the lower chamber 62 to potentially clog, i.e. block, the nozzles 56.

The liner 18 may additionally line the divider 58. To this end, the wall 24 may comprise a deflected portion 66 configured to extend into the cavity 30 and delimit a second opening 68. As such, the second end 34 of the liner 18 may be partially closed. In use, the second opening 68 may align with the first opening 64 to allow flow of the working fluid from the upper chamber 60 to the lower chamber 62. The deflected portion 66 may extend into the cavity 30 at an acute angle relative to the remainder of the wall 24. Thus, as shown in the illustrated embodiment, the deflected portion 66 of the wall 24 may be frustoconical, i.e. be shaped to match a profile of the divider 58. As shown in the illustrated embodiment, the liner 18 may facilitate correct positioning of the divider 58 and/or may hold the divider 58 in a correct position. In certain embodiments, the deflected portion 66 may provide the divider 58, i.e. the divider 58 may be an integral part of the liner 18. Alternatively, the divider 58 may be coupled to the liner 18, e.g. if each of the liner 18 and the divider 58 are manufactured as separate parts. The divider 58 may provide a base of the liner 18 and/or may be encapsulated within the wall 24.

The invention is not restricted to the details of any foregoing embodiments. The invention extends to any novel one, or any novel combination, of the features disclosed in this specification (including the accompanying claims and drawings) or to any novel one, or any novel combination, of the steps of any method or process so disclosed. The claims should not be construed to cover merely the foregoing embodiments, but also any embodiments which fall within the scope of the claims.

All of the features disclosed in this specification (including the accompanying claims and drawings) and/or all of the steps of any method or process so disclosed, may be combined in any combination, except combinations where at least some of such features and/or steps are mutually exclusive.

Each feature disclosed in this specification (including the accompanying claims and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A liner for a filter sub-assembly, the liner comprising:
a wall comprising
an outermost surface and
an innermost surface,
wherein the innermost surface is configured to bound a cavity extending between a first end of the liner and an opposing second end of the liner,
wherein the outermost surface comprises a textured portion that is textured,
wherein the textured portion of the outermost surface is textured by comprising spaced apart protrusions,
wherein one or more of the spaced apart protrusions extend from a remainder of the outermost surface by a protrusion height of 0.5 mm to 5.0 mm.

2. The liner according to claim 1, wherein
the spaced apart protrusions are arranged in a regular pattern.

3. The liner according to claim 1, wherein
the spaced apart protrusions are selected from the group consisting of bumps; ridges; ribs; and combinations thereof.

4. The liner according to claim 1, wherein
the protrusion height amounts to 1.0 mm to 3.5 mm.

5. A liner for a filter sub-assembly, the liner comprising:
a wall comprising:
an outermost surface and
an innermost surface,
wherein the innermost surface is configured to bound a cavity extending between a first end of the liner and an opposing second end of the liner,
wherein the outermost surface comprises a textured portion that is textured,
wherein the textured portion of the outermost surface is textured by comprising spaced apart indentations.

6. The liner according to claim 5, wherein
the spaced apart indentations are arranged in a regular pattern.

7. The liner according to claim 1, wherein
the textured portion of the outermost surface is circumferentially continuous.

8. The liner according to claim 1, wherein
the wall is a monolithic tubular sleeve.

9. The liner according to claim 1, wherein
the wall is formed of or comprises a resiliently deformable material.

10. The liner according to claim 1, wherein
the wall is formed of or comprises silicone.

11. The liner according to claim 1, wherein
the wall is formed of or comprises a fiber reinforced polymer.

12. The liner according to claim 11, wherein
the fiber reinforced polymer includes a first plurality of fibers orientated to extend circumferentially along the wall.

13. The liner according to claim 12, wherein
the fiber reinforced polymer includes a second plurality of fibers orientated to extend at least partially between the first and second ends of the liner.

14. The liner according to claim 11, wherein
the fiber reinforced polymer includes a plurality of fibers orientated to extend at least partially between the first and second ends of the liner.

15. The liner according to claim 1, wherein
the wall comprises a deflected portion configured to extend into the cavity and to delimit an opening.

16. The liner according to claim 15, wherein
at least the deflection portion of the wall is more rigid when compared to a remainder of the wall.

17. The liner according to claim 15, wherein
the deflected portion of the wall forms an acute angle with a remainder of the wall.

18. The liner according to claim 1, wherein
the liner is tapered such that a width of the liner reduces between the first and second ends of the liner.

19. A filter sub-assembly comprising:
a rotary vessel comprising a rotor body and a closure member separably attachable to the rotor body; and
a liner comprising a wall, the wall comprising
an outermost surface and
an innermost surface,
wherein the innermost surface is configured to bound a cavity extending between a first end of the liner and an opposing second end of the liner,
wherein the outermost surface comprises a textured portion that is textured,
wherein the textured portion of the outermost surface is textured by comprising spaced apart protrusions,
wherein one or more of the spaced apart protrusions extend from a remainder of the outermost surface by a protrusion height of 0.5 mm to 5.0 mm;
wherein the liner is receivable within the rotor body to line an inner surface of the rotor body.

20. The filter assembly according to claim 19, wherein
the closure member is separably attachable to the rotor body by insertion of the closure member into an open end of the rotor body.

21. The filter assembly according to claim 19, wherein
the closure member is sealable against the rotor body by the liner.

22. The filter assembly according to claim 19, wherein
the liner is removable from the rotor body by separation of the closure member from the rotor body.

23. The filter assembly according to claim 19, wherein
the liner comprises a retention member formed as a groove in an edge margin of the innermost surface of the of the liner and positioned proximate to the first end of the liner, the groove extending along the innermost surface to separably engage the closure member, providing a separable attachment of the liner to the closure member.

24. The liner according to claim 5, wherein
the wall is formed of or comprises a fiber reinforced polymer;
wherein the fiber reinforced polymer includes a plurality of fibers orientated to extend at least partially between the first and second ends of the liner.

25. The liner according to claim 5, wherein
the wall is formed of or comprises a resiliently deformable material.

26. The liner according to claim 5, wherein
the textured portion of the outermost surface is circumferentially continuous.

27. A filter sub-assembly comprising:
a rotary vessel comprising a rotor body and a closure member separably attachable to the rotor body; and
a liner according to claim 5;
wherein the liner is receivable within the rotor body to line an inner surface of the rotor body.

* * * * *